United States Patent [19] [11] Patent Number: 5,018,034
Tanaka et al. [45] Date of Patent: May 21, 1991

[54] BI-DIRECTIONAL TAPE RECORDER WITH PIVOTED MAGNETIC HEAD

[75] Inventors: Shinsaku Tanaka, Tokyo; Toshio Yoshimura, Kawasaki, both of Japan

[73] Assignee: Tanashin Denki Co., Ltd., Tokyo, Japan

[21] Appl. No.: 334,489

[22] Filed: Apr. 7, 1989

[30] Foreign Application Priority Data

Jul. 20, 1988 [JP] Japan ............................. 63-96062[U]

[51] Int. Cl.⁵ ............................................... G11B 5/55
[52] U.S. Cl. ..................................... 360/106; 360/109
[58] Field of Search ......................... 360/106, 109, 105

[56] References Cited

U.S. PATENT DOCUMENTS 3,601,409  8/1971  Marshall .............................. 360/106
3,705,270  12/1972  Huber .............................. 360/106 X Primary Examiner—A. J. Heinz
Attorney, Agent, or Firm—Wegner, Cantor, Mueller & Player

[57] ABSTRACT

A bi-directional tape recorder wherein abrasion of portions of a magnetic head on the opposite sides of the air gap is reduced and "soil" sticking to a tape contacting face of the magnetic head is automatically removed to attain elongation of the life of the magnetic head. The magnetic head is changed over between a pair of positions inclined with respect to a fixed axis perpendicular to the tape feeding direction by a shiftable member which is shifted in one or the other direction in response to reversing operation of the tape feeding direction. The magnetic head is connected to be moved in a widthwise direction of a magnetic tape by the shiftable member to allow reproduction of a pair of regenerative tracks of the magnetic tape. A pair of azimuth adjusting mechanisms are provided on the opposite sides of the magnetic head for making azimuth adjustment of the magnetic head independently of each other, and one of them is associated with the shiftable member.

5 Claims, 4 Drawing Sheets

1

BI-DIRECTIONAL TAPE RECORDER WITH PIVOTED MAGNETIC HEAD

BACKGROUND OF THE INVENTION (1) Field of the Invention

This invention relates to improvements in or relating to a bi-directional tape recorder wherein a magnetic head is changed over from an inclined position to another inclined position or vice versa each time the feeding direction of a tape is reversed so as to reduce concentrated abrasion at a portion of the magnetic head adjacent the air gap and attain an effect of cleaning the magnetic head to elongate the life of the magnetic head.

(2) Description of the Prior Art

Conventional tape recorders including bi-directional tape recorders commonly include a magnetic head having a center axis disposed in a perpendicular relationship to a feeding direction of a magnetic tape.

FIG. 7 illustrates such a relationship between a magnetic head and a magnetic tape. In particular, referring to FIG. 7, a magnetic tape b is fed along a path indicated by a two-dot chain line, and a magnetic head a is disposed such that a center axis thereof extends in a perpendicular relationship to the magnetic tape b being fed along the path.

Accordingly, the magnetic tape b contacts most strongly with portions of the magnetic head a adjacent the magnetic gap c formed at the center of a rounded tape contacting face d of the magnetic head a. Consequently, abrasion occurs most significantly at the portions of the magnetic head a, and after such abrasion proceeds to a certain degree, the recording and reproducing characteristics of the magnetic head a are deteriorated suddenly to such a degree that the magnetic head a may not stand its use any more.

Also the magnetic tape b is abraded by such contact between the magnetic head a and the magnetic tape b. Fine powder is produced as a result of abrasion and thus sticks as "soil" to the tape contacting face of the magnetic head a, resulting in deterioration of the recording and reproducing characteristics of the magnetic head a. Accordingly, in order to use the magnetic head a always in a good condition, it is necessary to frequently clean the tape contacting face of the magnetic head a. Such a cleaning operation, however, is cumbersome.

SUMMARY OF THE INVENTION

It is an object of the present invention to provide a bi-directional tape recorder wherein abrasion of portions of a magnetic head on the opposite sides of the air gap is reduced and "soil" sticking to a tape contacting face of the magnetic head is automatically removed to attain elongation of the life of the magnetic head.

In order to attain the object, according to the present invention, a bi-directional tape recorder wherein reproduction can be made in whichever direction a magnetic tape is fed is constituted such that the magnetic head is disposed for pivotal motion between a pair of substantially symmetrical inclined positions in which the magnetic head is inclined with respect to a fixed axis perpendicular to the tape feeding direction, and the magnetic head is changed over between the inclined positions by a shiftable member which is shifted in one or the other direction in response to reversing operation of the tape feeding direction.

With the tape recorder, when the tape feeding direction is reversed, the shiftable member is shifted in one or the other direction in response to the reversing operation. Thereupon, the magnetic head is changed over from one to the other of the inclined positions or vice versa with respect to the fixed axis perpendicular to the tape feeding direction by the shiftable member. In either of the inclined positions of the magnetic head, a magnetic tape contacts most strongly with either one of portions of the magnetic head on the opposite sides the air gap, and each time the tape feeding direction is reversed, the portions of the magnetic head are alternately contacted most strongly by a magnetic tape. Consequently, abrasion will not take place at a particular limited portion of the magnetic head, and accordingly abrasion of the magnetic head is reduced particularly at portions adjacent the air gap, resulting in elongation of the life of the magnetic head. Further, each time the magnetic head is changed over between the inclined positions in response to reversing of the tape feeding direction, a portion of the magnetic head on which "soil" has accumulated most is moved to a position at which a magnetic tape is slidably contacted most strongly with the magnetic head. Consequently, the "soil" of the magnetic head is automatically removed by the magnetic tape. Accordingly, a particularly excellent practical effect can be attained if the present invention is applied to a tape recorder of the car stereo type for which head cleaning cannot be effected readily.

Preferably, the magnetic head is of the two-channel type and is moved in a widthwise direction of the magnetic tape by the shiftable member between a pair of positions in which different ones of a pair of regenerative tracks of the magnetic tape are in register with the air gap of the magnetic head. With the construction, there is no necessity of additional provision of a driving means for pivoting the head, and the tape recorder is simplified in construction.

A pair of azimuth adjusting mechanisms may be provided on the opposite sides of the magnetic head for making azimuth adjustment of the magnetic head independently of each other, and at least one of the head azimuth adjusting mechanisms may include a pair of azimuth adjusting screws screwed in the opposite side portions of the magnetic head for contacting at one ends thereof with part of the shiftable member. With the construction, azimuth adjustment at either of the lowered position and the lifted position of the magnetic head can be effected without having any influence on results of azimuth adjustment at the other position of the magnetic head. Accordingly, in whichever direction the magnetic tape is fed, head azimuth adjustment can be effected readily with a high degree of accuracy.

The inclined positions of the magnetic head may be defined by a pair of stoppers located in a symmetrical relationship with respect to the fixed axis perpendicular to the tape feeding direction for contacting with the magnetic head. Preferably, each of the stoppers is formed from a tape guide element existing in the tape recorder. This eliminates provision of additional parts for the stoppers.

The shiftable member may have a pair of resilient elements formed integrally thereon for resiliently engaging with the opposite faces of the magnetic head to resiliently hold the magnetic head against the stoppers. The inclined positions of the magnetic head can be defined definitely by the combination of the resilient elements and the stoppers.

DETAILED DESCRIPTION OF THE ILLUSTRATED EMBODIMENT

Figure 1:
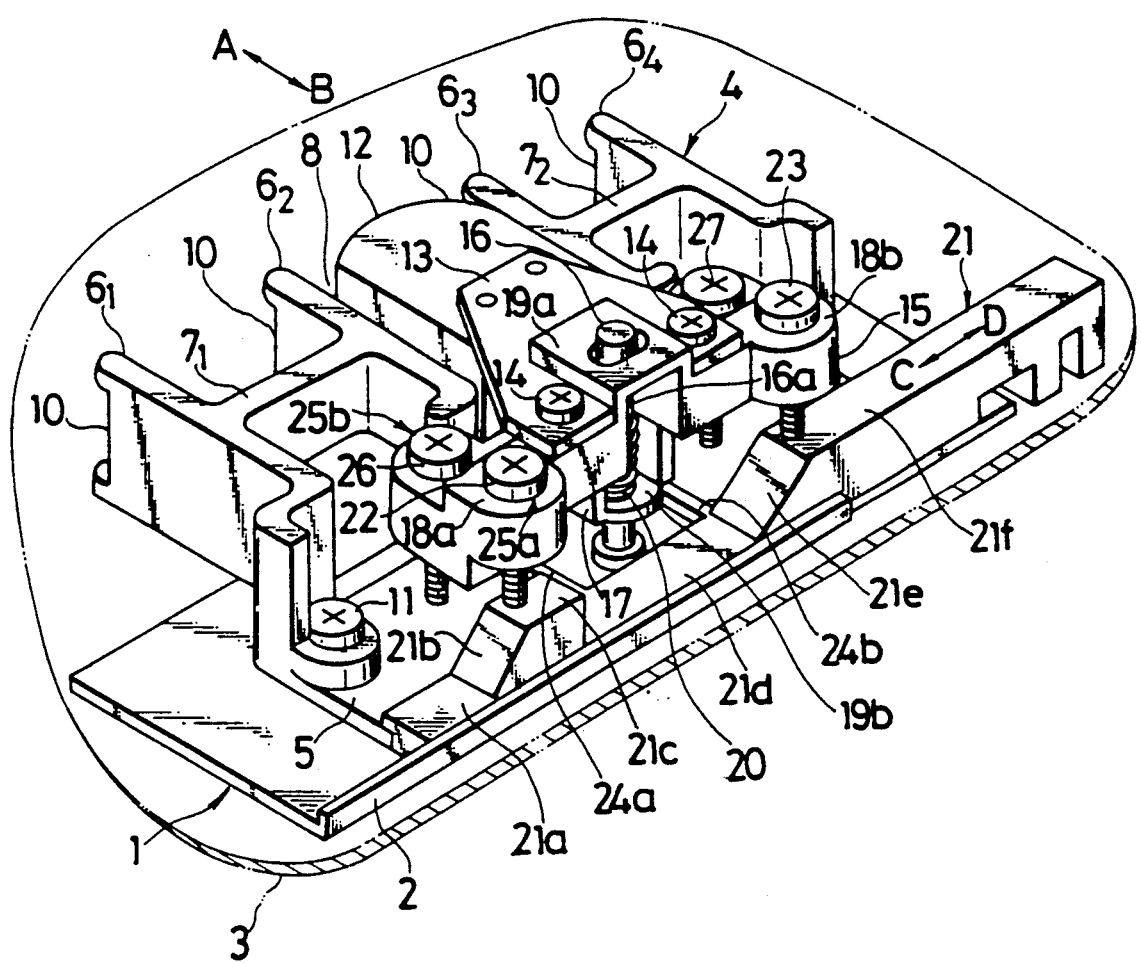
FIG. 1 is a perspective view of essential part of a bi-directional tape recorder according to the present invention.

Referring first to FIG. 1, there is shown a bi-directional tape recorder according to the present invention. The tape recorder shown includes a head mounting plate 1 made of a metal plate and elongated in a widthwise direction of the tape recorder. The head mounting plate 1 is mounted for back and forth movement within a predetermined range in the directions indicated by arrow marks A and B on a chassis 3 and has a low upwardly bent wall 2 formed along a rear edge portion thereof.

Figure 2:
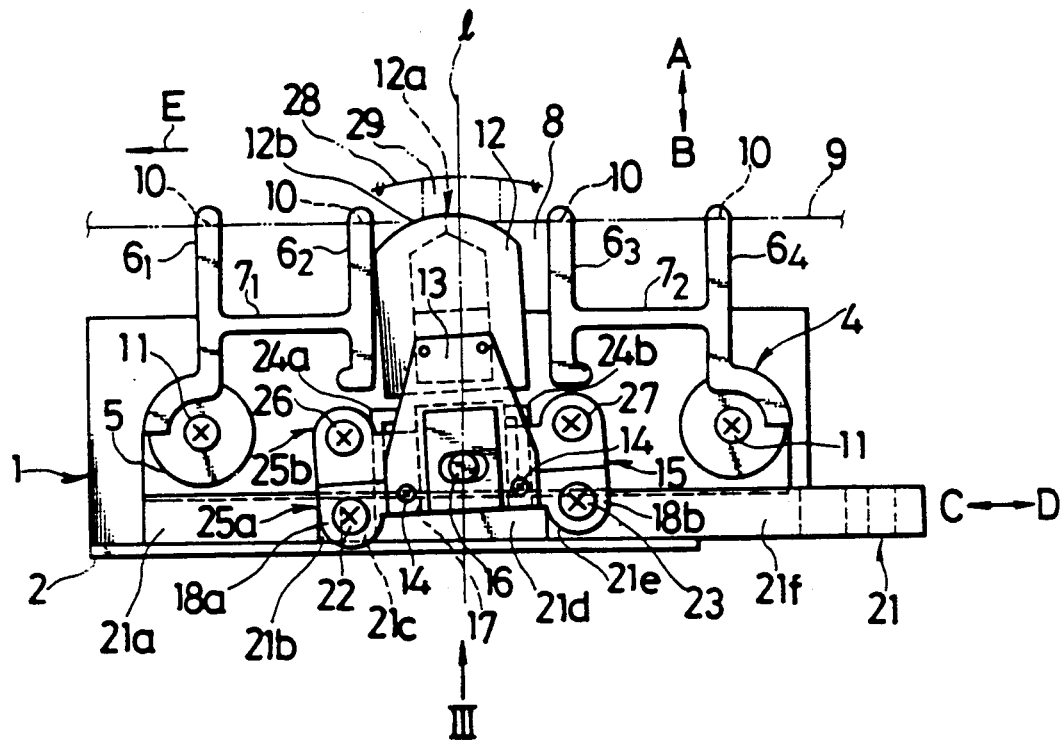
FIG. 2 is a top plan view of the tape recorder shown in FIG. 1.

Referring also to FIG. 2, a tape position controlling member 4 made of a synthetic resin is mounted on an upper face of the head mounting plate 1. The tape position controlling member 4 has a bottom plate 5 elongated in the widthwise direction of the tape recorder, and first, second, third and fourth tape guide pieces $6_1$, $6_2$, $6_3$ and $6_4$ formed in a parallel predetermined spaced relationship in the longitudinal direction of the bottom plate 5 on an upper face of a front portion of the bottom plate 5. The first to fourth guide pieces $6_1$ to $6_4$ extend vertically upwardly from the bottom plate 5, and a front end portion of each of them extends horizontally forwardly by a predetermined extent from a front edge of the bottom plate 5. The first and second tape guide pieces $6_1$ and $6_2$ are connected in an integral relationship to each other by a connecting wall $7_1$ interposed between substantially mid portions of them in the horizontal direction. Meanwhile, the third and fourth tape guides $6_3$ and $6_4$ are connected in an integral relationship to each other by another connecting wall $7_2$ interposed between substantially mid portions of them in the horizontal direction. A locating spacing 8 for a magnetic head 12 which will be hereinafter described is defined between the second and third tape guide pieces $6_2$ and $6_3$. A recess 10 is formed in a front end edge of each of the first to fourth tape guide pieces $6_1$ and $6_4$ and has a width or vertical dimension substantially equal to or a little greater than the width of a magnetic tape 9. Thus, when the magnetic tape 9 runs in the direction indicated by an arrow mark E in FIG. 2 along a rounded tape contacting face 12b of the magnetic head 12, the magnetic tape 9 is received in the recesses 10 of the tape position controlling member 4 so that widthwise movement thereof is inhibited. The tape position controlling member 4 having such a construction as described above is secured at the longitudinal opposite end portions of the bottom plate 5 thereof to the upper face of the head mounting plate 1 by a pair of fastening screws 11.

The magnetic head 12 is of the two-channel type and is disposed for pivotal changing over motion between first and second inclined positions with respect to a fixed axis l perpendicular to the tape feeding direction or the path of the magnetic tape 9 in the locating spacing 8 between the second and third tape guide piece $6_2$ and $6_3$ of the tape position controlling member 4. The magnetic head 12 has a support plate 13 secured to an upper face thereof by spot welding or by some other suitable means. The support plate 13 is made of a metal and secured also to an upper face of a substantially mid portion of a holder 15 by means of a pair of fastening screws 14.

Figure 3:
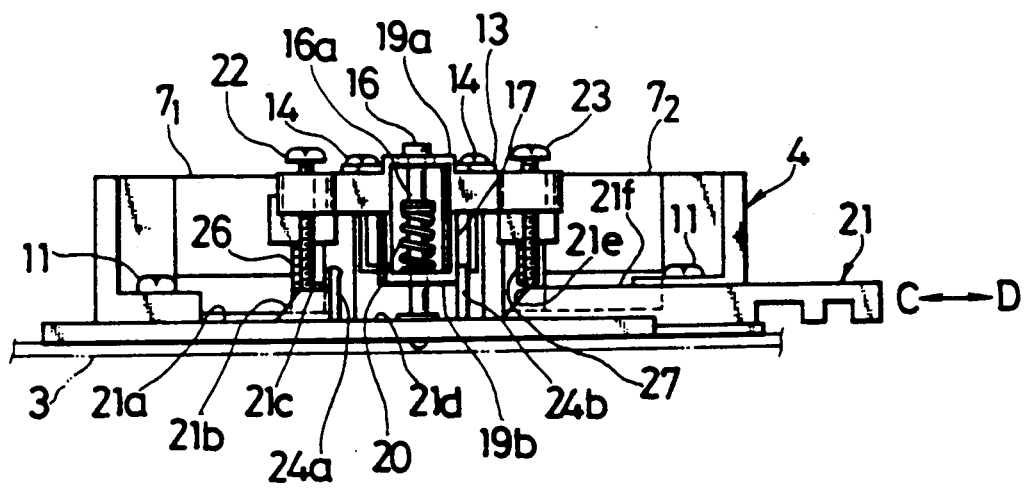
FIG. 3 is a rear elevational view of the tape recorder as viewed in the direction indicated by an arrow mark III in FIG. 2.

Referring also to FIG. 3, the holder 15 is made of a synthetic resin and mounted at a substantially mid portion thereof for pivotal motion around and also for up and down motion on a mounting shaft 16 within a predetermined range. The mounting shaft 16 is secured at a lower end thereof to the upper face of the bottom plate 5 of the head mounting plate 1 by caulking and extends uprightly from the bottom plate 5. The holder 15 has a main body 17 of a rectangular tubular section which is opened on the rear side thereof, and a pair of left and right apron walls 18a and 18b formed in an integral relationship on the opposite sides of an upper end portion of the main body 17 thereof. The mounting shaft 16 extends through upper and lower walls 19a and 19b of the main body 17. The holder 15 is normally biased downwardly by a coil spring 20 interposed between the lower wall 19b of the main body 17 of the holder 15 and a spring receiving portion 16a of the mounting shaft 16. The holder 15 is operatively associated with a shiftable member 21 such that the former may be moved up or down along and pivoted around the mounting shaft 16 by the latter when the latter is shifted.

The shiftable member 21 is connected to an automatic tape reversing mechanism not shown such that the former may be shifted in a direction indicated by an arrow mark C or D in FIGS. 1 to 5 by the latter in response to a tape feeding direction reversing operation of the latter. Here, such shifting movement of the shiftable member 21 may be derived from movement of any component of the tape recorder in a tape feeding direction reversing operation of the automatic tape reversing mechanism, such as, for example, movement of either of a pair of left and right pinch rollers (not shown) into or out of contact with a corresponding capstan (not shown) or movement of a motion transmitting mechanism to establish or disconnect a motion transmitting route from a motor (not shown) to a pair of left and right reel receivers (not shown). The shiftable member 21 is in the form of an elongated rod made of a resilient synthetic resin and is mounted for longitudinal shifting movement within a predetermined range in the directions indicated by the arrow marks C and D in FIGS. 1 to 5 on the head mounting plate 1 between the bottom plate 5 of the tape position controlling member 4 and the upwardly bent wall 2 of the head mounting plate 1. The shiftable member 21 has a first lower face 21a, a first inclined face 21b, a first higher face 21c, a second lower face 21d, a second inclined face 21e and a second higher face 21f provided on the upper side thereof in a juxtaposed relationship in this order from the left to the right.

A first azimuth adjusting screw 22 is screwed in a rear portion of the left-hand side apron wall 18a of the holder 15 and has a lower end provided for contacting with the first lower face 21a, first inclined face 21b and first higher face 21c of the shiftable member 21. Meanwhile, a second azimuth adjusting screw 23 is screwed in a rear portion of the other or right-hand side apron wall 18b of the holder 15 and has a lower end provided for contacting with the second lower face 21a, second inclined face 21b and second higher face 21c of the shiftable member 21. Further, third and fourth azimuth adjusting screws 26 and 27 are screwed in front portions of the left- and right-hand side apron walls 18a and 18b, respectively, and have lower ends provided for contacting with the upper face of the bottom plate 5 of the tape position controlling member 4.

When the shiftable member 21 is at its leftwardly shifted position, that is, at its limit position in the direction of the arrow mark C in FIGS. 1 to 5, the magnetic tape 9 is fed from the right to the left as indicated by the arrow mark in FIG. 2. Meanwhile, the lower ends of the first and second azimuth adjusting screws 22 and 23 lie respectively on the first and second higher faces 21c and 21f of the shiftable member 21 while the lower ends of the third and fourth azimuth adjusting screws 26 and 27 are held in a spaced relationship above the upper face of the bottom plate 5 as particularly seen in FIG. 6(a). Consequently, the magnetic head 12 is held at its lifted or upper position together with the holder 15 under the biasing force of the spring 20. When the magnetic head 12 is in its lifted position, the air gap 12a thereof is held in register with one of a pair of regenerative tracks of the magnetic tape 9.

Figure 4:
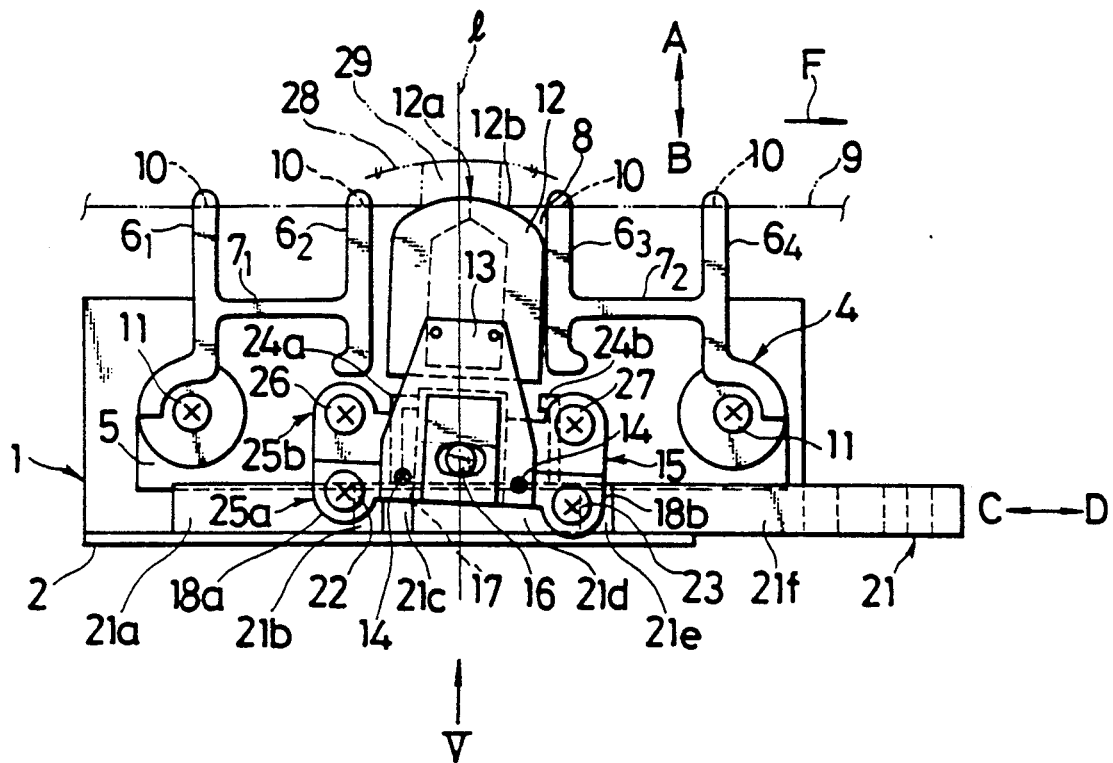
FIG. 4 is a view similar to FIG. 2 but showing the tape recorder when a tape is fed in the opposite direction.

To the contrary, when the shiftable member 21 is at its rightwardly shifted position, that is, at its limit position in the direction of the arrow mark D in FIGS. 1 to 5, the magnetic tape 9 is fed from the left to the right as indicated by an arrow mark F in FIG. 4. Meanwhile, the lower ends of the third and fourth azimuth adjusting screws 26 and 27 lie on the upper face of the bottom plate 5 of the tape position controlling member 4 while the lower ends of the first and second azimuth adjusting screws 22 and 23 are held in a spaced relationship respectively above the first and second higher faces 21c and 21d of the shiftable member 21 as particularly seen in FIG. 6(b). Consequently, the magnetic head 12 is held at its lowered portion under the biasing force of the spring 20 and the magnetic gap 12a thereof is held in register with the other regenerative track of the magnetic tape 9.

When the shiftable member 21 is shifted from the rightwardly shifted position to the leftwardly shifted position or vice versa, the lower ends of the first and second azimuth adjusting screws 22 and 23 are slidably contacted with and guided by the first and second inclined faces 21b and 21e of the shiftable member 21, respectively, so that the magnetic head 12 is moved from the lifted position to the lowered position or vice versa together with the holder 12.

Referring to FIGS. 1 and 2, the shiftable member 21 has a pair of resilient pressing pieces 24a and 24b formed in a predetermined spaced relationship from each other integrally on the front side thereof. The pressing pieces 24a and 24b extend first horizontally forwardly from the shiftable member 21 and then vertically upwardly until the main body 17 of the holder 15 in the lifted position is located between the pressing pieces 24a and 24b of the shiftable member 21.

When the shiftable member 21 is shifted in the leftward direction in FIG. 4, the right-hand side pressing piece 24b thereof resiliently presses against an opposing right-hand side face of the main body 17 of the holder 15. Consequently, the magnetic head 12 is pivoted in the counterclockwise direction in FIG. 4 around the mounting shaft 16 in an integral relationship with the holder 15 to the first inclined position in which it is inclined leftwardly with respect to the axis l perpendicular to the tape feeding direction as seen in FIG. 2. The first inclined position of the magnetic head 12 is defined by a right-hand side face of the second tape guide piece $6_2$ of the tape position controlling member 4 which serves as a stopper for the magnetic head 12. The resilient pressing piece 24b of the shiftable member 21 acts to resiliently hold the magnetic head 12 against the second tape guide piece $6_2$ of the tape position controlling member 4.

To the contrary, when the shiftable member 21 is shifted rightwardly in FIG. 2, the left-hand side pressing piece 24a thereof resiliently presses against another opposing left-hand side face of the main body 17 of the holder 15. Consequently, the magnetic head 12 is pivoted in the clockwise direction in FIG. 2 around the mounting shaft 16 in an integral relationship with the holder 15 to the second inclined position in which it is inclined rightwardly with respect to the axis l perpendicular to the tape feeding direction as seen in FIG. 4. The second inclined position of the magnetic head 12 is defined by a left-hand side face of the third tape guide piece $6_3$ of the tape position controlling member 4 which serves as a stopper for the magnetic head 12. The resilient pressing piece 24a of the shiftable member 21 also acts to resiliently hold the magnetic head 12 against the third tape guide piece $6_3$ of the tape position controlling member 4.

A pair of head azimuth adjusting mechanism 25a and 25b are provided on the opposite sides of the magnetic head 12 for making azimuth adjustment of the magnetic head 12 independently of each other. The head azimuth adjusting mechanism 25a is constituted from the first and second azimuth adjusting screws 22 and 23 and the first and second higher faces 21c and 21f of the shiftable member 21 described hereinabove. To the contrary, the other head azimuth adjusting mechanism 25b is constituted from the third and fourth azimuth adjusting screws 26 and 27 and the bottom plate 5 of the tape position controlling member 4 also described hereinabove.

Subsequently, operation of the bi-directional tape recorder having such a construction as described above will be described with reference to FIGS. 2 to 5. FIGS. 2 and 3 show the tape recorder in a condition in which the magnetic tape 9 is being fed from the right to the left as indicated by the arrow mark E and the shiftable member 21 is in the leftwardly shifted position. In the condition of the tape recorder, the magnetic head 12 is held at its lifted position together with the holder 15 in which the air gap 12a thereof is held in register with one of a pair of regenerative tracks of the magnetic tape 9. Further, the magnetic head 12 is in the first inclined position in which it is inclined leftwardly with respect to the axis l perpendicular to the tape feeding direction.

While the magnetic tape 9 is thus being fed from the right to the left in FIG. 2 to effect a reproducing operation of the one reproduction track thereof, it is resiliently pressed against the tape contacting face 12b of the magnetic head 12 by a pad 29 which is mounted on a pad spring 28 within a tape cassette not shown. In this instance, the magnetic tape 9 is contacted most strongly with a portion of the magnetic head 12 rightwardly of the air gap 12a in FIG. 2.

Figure 5:
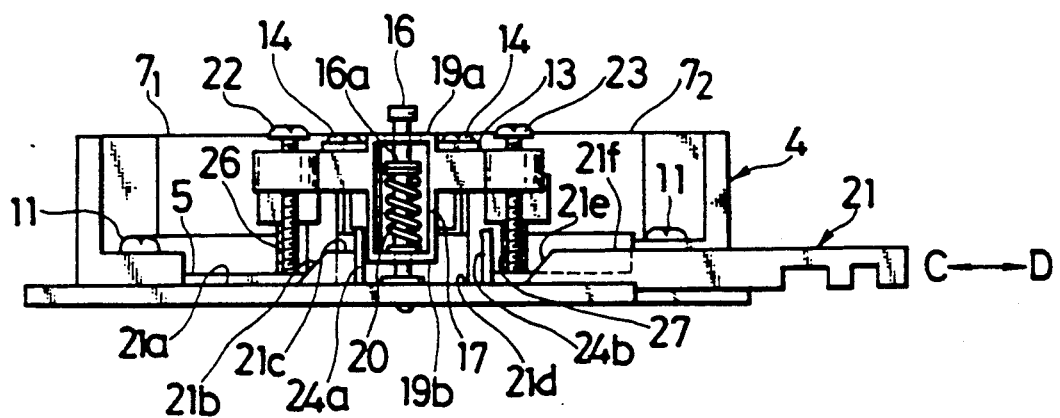
FIG. 5 is a rear elevational view of the tape recorder as viewed in the direction indicated by an arrow mark V in FIG. 4.

Then, the tape recorder is operated to reverse the tape feeding direction so that the magnetic tape 9 may be fed from the left to the right. Thereupon, the shiftable member 21 is shifted rightwardly in the direction indicated by the arrow mark D from the position shown in FIGS. 2 and 3 by the automatic tape reversing mechanism (not shown) described hereinabove. During such shifting movement of the shiftable member 21, the lower ends of the first and second azimuth adjusting screws 22 and 23 are disengaged from the first and second higher faces 21c and 21f and then slidably move on the first and second inclined faces 21b and 21e of the shiftable member 21, respectively. Then, when the lower ends of the first and second azimuth adjusting screws 22 and 23 come near to the first and second lower faces 21a and 21d, respectively, the lower ends of the third and fourth azimuth adjusting screws 26 and 27 are contacted with and stopped by the upper face of the bottom plate 5 of the tape position controlling member 5 as seen in FIG. 5, thereby defining the lowered position of the magnetic head 12. Meanwhile, when the shiftable member 21 is shifted rightwardly, the left-hand side face of the main body 17 of the holder 15 is resiliently pressed by the left-hand side pressing piece 24e of the shiftable member 21 so that the magnetic head 12 is pivoted in the clockwise direction in FIG. 2 around the mounting shaft 16 in an integral relationship with the holder 15 to the second inclined position in which it is inclined rightwardly with respect to the axis 1 perpendicular to the tape feeding direction as seen in FIG. 4. In the position of the magnetic head 12, the magnetic tape 9 is pressed most strongly against another portion of the tape contacting face 12b of the magnetic head 12 leftwardly of the air gap 12a and is fed from the left to the right with the other regenerative track thereof held in register with the air gap 12a of the magnetic head 12, thereby performing a reproducing operation of the other regenerative track of the magnetic tape 9.

After the direction of the inclination of the magnetic head 12 with respect to the axis 1 perpendicular to the tape feeding direction is changed over as the feeding direction of the magnetic tape 9 is reversed in this manner, while the magnetic tape 9 slides on the tape contacting face 12b of the magnetic head 12, it is pressed most strongly against a portion of the tape contacting face 12b of the magnetic head 12 on which "soil" has accumulated most during the preceding feeding operation of the magnetic tape 12. Consequently, the "soil" of the magnetic head 12 is automatically removed by such sliding contact of the magnetic tape 9 with the magnetic head 12.

A procedure of performing azimuth adjustment of the magnetic head 12 will be described below. At first, when the shiftable member 21 is in its rightwardly shifted position in which the lower ends of the third and fourth azimuth adjusting screws 26 and 27 contact with the upper face of the bottom plate 5 of the tape position controlling member 4 as shown in FIG. 6(b), azimuth adjustment of the magnetic head 12 at its lowered position can be effected by suitably turning the third and fourth azimuth adjusting screws 26 and 27 in one or the other direction to advance or retract them with respect to the holder 15.

Figure 6A:
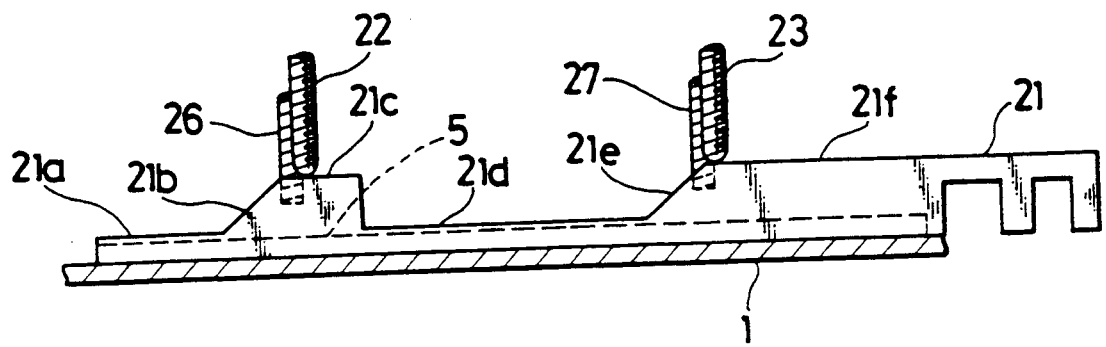
FIGS. 6(a) and 6(b) are schematic views illustrating different positions of a shiftable member and azimuth adjusting screws.
Figure 6B:
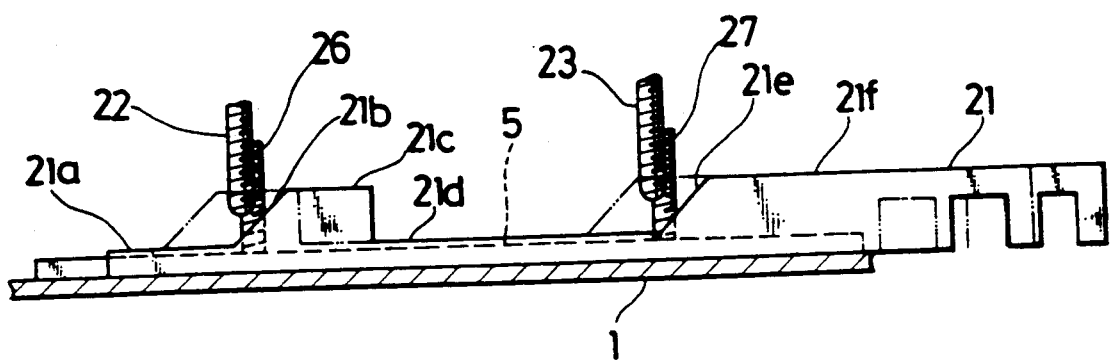
Figure 7:
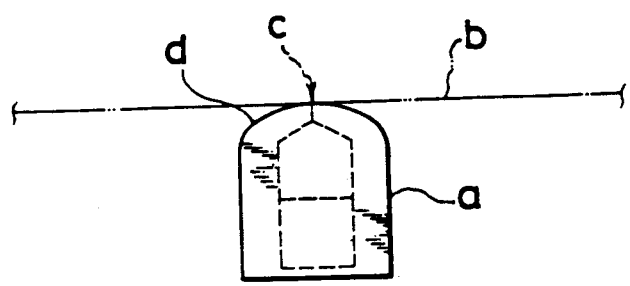
FIG. 7 is a plan view illustrating a contacting relationship between a magnetic head and a tape in a conventional tape recorder.

To the contrary, when the shiftable member 21 is in its leftwardly shifted position, the lower ends of the first and second azimuth adjusting screws 22 and 23 contact with the first and second higher faces 21c and 21f of the shiftable member 21, respectively, as shown in FIG. 6(a). Thus, azimuth adjustment of the magnetic head 12 at the lifted position can be effected by turning the first and second azimuth adjusting screws 22 and 23 in one or the other direction to advance or retract them with respect to the holder 15. It is to be noted that the azimuth adjustment have no influence on results of the azimuth adjustment at the lowered position of the magnetic head 12.

While in the embodiment described above the magnetic head 12 is inclined rightwardly when the magnetic tape 9 is fed in the rightward direction whereas the magnetic head 12 is inclined leftwardly when the magnetic tape 9 is fed leftwardly, similar effects can be attained even if the relationship between the feeding direction of the magnetic tape 9 and the direction of the inclination of the magnetic head 12 is reversed.

What is claimed is:

1. A bi-directional tape recorder device wherein reproduction can be made in whichever direction a magnetic tape is fed, comprising:
   a head holder;
   a magnetic head disposed on said head holder, wherein said head holder is pivotable about an axis which extends parallel to, and is spaced from, a widthwise direction of the magnetic tape;
   pivot-limiting means for limiting the amount of pivot of said head holder to the same extent on both sides of a line which extends perpendicular to a plane in which the magnetic tape lies, said pivot-limiting means including a pair of pivot-limiting members; and
   a shiftable member having at least one engagement means for engaging said head holder, said shiftable member being shifted forward or backward in response to each change-over operation of the running direction of the magnetic tape so that the head holder is pivoted.

2. A bi-directional tape recorder as claimed in claim 1, wherein said magnetic head is of the two-channel type and is moved in the widthwise direction of the magnetic tape by said shiftable member between two positions in which different ones of two recorded tracks of the magnetic tape are in register with an air gap of said magnetic head.

3. A bi-directional tape recorder as claimed in claim 2, wherein a pair of azimuth adjusting mechanisms are provided on opposite sides of said magnetic head for making azimuth adjustment of said magnetic head independently of each other, and at least one of said head azimuth adjusting mechanisms includes a pair of azimuth adjusting screws screwed in opposite side portions of said magnetic head for contacting at one ends thereof with a part of said shiftable member.

4. A bi-directional tape recorder as claimed in any one of claims 2, 3 and 1, wherein the pivot-limiting members are stoppers located in a symmetrical relationship with respect to the line perpendicular to the plane of the magnetic tape, and each of said stoppers is a tape guide element.

5. A bi-directional tape recorder as claimed in any one of claims 2, 3 and 1, wherein the pivot-limiting members are stoppers located in a symmetrical relationship with respect to the line perpendicular to the plane of the magnetic tape, and said shiftable member has a pair of resilient elements formed integrally thereon for selectively and resiliently engaging with opposite faces of said magnetic head to selectively and resiliently hold said magnetic head against said stoppers.

* * * * *